(12) United States Patent
Penikis

(10) Patent No.: US 8,706,778 B2
(45) Date of Patent: Apr. 22, 2014

(54) METHODS AND SYSTEMS FOR AN ACTION-BASED INTERFACE FOR FILES AND OTHER ASSETS

(75) Inventor: Gunar Mark Penikis, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 272 days.

(21) Appl. No.: 12/644,153

(22) Filed: Dec. 22, 2009

(65) Prior Publication Data

US 2013/0198156 A1  Aug. 1, 2013

(51) Int. Cl.
*G06F 17/30* (2006.01)

(52) U.S. Cl.
CPC .... *G06F 17/30058* (2013.01); *G06F 17/30067* (2013.01)
USPC ........... 707/805; 707/707; 707/726; 707/781; 707/705; 715/716

(58) Field of Classification Search
CPC .................. G06F 17/30067; G06F 17/30058
USPC ........... 707/705, 707, 726, 781, 805; 715/716
See application file for complete search history.

(56) References Cited

U.S. PATENT DOCUMENTS

| | | | | |
|---|---|---|---|---|
| 5,956,481 | A * | 9/1999 | Walsh et al. | 726/23 |
| 6,389,464 | B1 * | 5/2002 | Krishnamurthy et al. | 709/220 |
| 6,493,006 | B1 * | 12/2002 | Gourdol et al. | 715/825 |
| 6,665,657 | B1 * | 12/2003 | Dibachi | 1/1 |
| 6,910,189 | B2 * | 6/2005 | Abdelhadi et al. | 715/752 |
| 7,177,872 | B2 * | 2/2007 | Schwesig et al. | 1/1 |
| 7,983,962 | B2 * | 7/2011 | Wittmer et al. | 705/26.8 |
| 8,024,292 | B2 * | 9/2011 | Thompson et al. | 707/640 |
| 2007/0109584 | A1 * | 5/2007 | Motohashi et al. | 358/1.13 |
| 2009/0019532 | A1 * | 1/2009 | Jacobsen et al. | 726/5 |
| 2009/0138484 | A1 * | 5/2009 | Ramos et al. | 707/10 |
| 2010/0064296 | A1 * | 3/2010 | Bertram et al. | 719/315 |

OTHER PUBLICATIONS

Virage MediaBin, downloaded from http://www.interwoven.com (last accessed Oct. 18, 2009).
Interwoven WorkSite, downloaded from http://www.interwoven.com (last accessed Oct. 18, 2009).
Konqueror—Universal viewer, downloaded from http://konqueror.kde.org/features/viewer.php (last accessed Oct. 18, 2009).

(Continued)

*Primary Examiner* — Frantz Coby
(74) *Attorney, Agent, or Firm* — Kilpatrick Townsend & Stockton LLP

(57) ABSTRACT

An "asset-based" user interface can be provided based on consulting metadata with an asset and presenting an interface to allow selection of actions associated with that particular asset. By presenting a listing of actions in response to a single command, the user can be spared the need to navigate through contextual menus to determine available services. The interface can be presented in a file selection interface provided by an operating system, e.g., in response to an "open" command in a folder. A method can comprise identifying a command referencing an asset and accessing metadata associated with the asset. The accessed metadata can comprise a unique metadata record for the asset available locally and/or accessible from a remote computing system. The method may further comprise determining one or more actions available for use with the referenced asset and providing an interface for selecting one or more of the determined actions.

28 Claims, 6 Drawing Sheets

(56) References Cited

OTHER PUBLICATIONS

Faure, Creating and Using Components (KParts), downloaded from http://developer.kde.org/documentation/tutorials/kparts (last accessed Oct. 18, 2009).

Apple, Inc., Dock+Finder, downloaded from http://www.apple.com/macosx/what-is-macosx/doc-and-finder.html (last accessed Dec. 22, 2009).

Kampffmeyer, ECM Enterprise Content Management (2006), downloaded from http://www.project-consult.net/Files/ECM_White%20Paper_kff_2006.pdf (last accessed Dec. 22, 2009).

* cited by examiner

METHODS AND SYSTEMS FOR AN ACTION-BASED INTERFACE FOR FILES AND OTHER ASSETS

TECHNICAL FIELD

The disclosure below generally relates to software development, particularly to user interfaces.

BACKGROUND

User interfaces for accessing assets, such as files, generally conform to a application-centric workflow. For example, an operating system may present a file browsing interface which, in response to selection of a file, consults data mapping the file type, MIME type, or other data to a particular application available for use in opening the file. If a different application is desired, the user must select the application manually—the user may select a file and be presented with a contextual menu listing applications for use in opening the file or for use in performing other tasks (e.g., "convert to PDF", "print", etc.). Similar functionality may be supported by content management software, which may allow a user to login and access documents, copy a document to a local file, and launch an application. These and similar systems may not provide the best workflow for all situations.

SUMMARY

An "asset-based" user interface can be provided based on consulting metadata associated with (or comprising) an asset and presenting an interface to allow selection of actions associated with that particular asset. By presenting a listing of actions in response to a single command, the user can be spared the need to navigate through contextual menus to determine available services. In some embodiments, the available actions can be based on metadata records managed by others in order to ensure appropriate client-side asset usage and the asset-based user interface is presented in a file selection interface provided by an operating system.

Embodiments include a method comprising identifying, by a computing system, a command referencing an asset and accessing metadata associated with the asset. The accessed metadata can comprise a unique metadata record for the asset, with the record available locally and/or accessible from a remote computing system. The method may further comprise determining one or more actions available for use with the referenced asset and providing an interface, the interface comprising an interface element configured to receive a selection of the determined action.

For example the interface can comprise a thumbnail of the file and a listing of the determined actions, such as "open," "print," "check out," and other actions associated with web services, local or remote applications, operating system functionality, and other services. The method may comprise receiving selection of one or more of the determined actions and, in response, invoking a service from the interface in response to receipt of the selection.

In some embodiments, determining an action comprises identifying which services are indicated in the metadata record as available for use with the referenced asset. For instance, the metadata record may include a list of services indicating some services as available and some services as unavailable. Furthermore, the metadata may indicate to the computing system how a service is to be invoked, such as by including (or referencing) data or particular commands for invoking a web service, launching an application, or otherwise taking action.

In some embodiments, the method includes requesting the unique metadata record from a registry at a remote computing system by providing a unique identifier associated with the referenced asset to the registry. The unique identifier for the referenced asset can be available at the computing system that makes the request, such as in locally-stored metadata included in or associated with the asset. The asset may comprise a locally-available file or a file identifier. In addition to the unique identifier of the asset, in some embodiments the request may include a user identifier, with the registry providing a record that indicates different available actions for different users.

In some embodiments, identifying the command referencing the asset comprises intercepting a file open command provided through a file browsing interface of an operating system. The operating system can be prevented from opening the file in response to the file open command. Instead, the file may be opened in response to selection of a corresponding action in the interface, or may not be opened at all if a different (or no) action is selected.

The method can comprise, while providing the interface, checking for a change in the metadata associated with the asset and updating at least one of the determined action or other information in the interface. For example, a particular service may become available (or unavailable) based on changes carried out by other users with access to the asset and the interface can be updated to reflect the newly-available (or unavailable) actions.

Embodiments also include computing systems and computer-readable media implementing one or more aspects of the present subject matter. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1A:
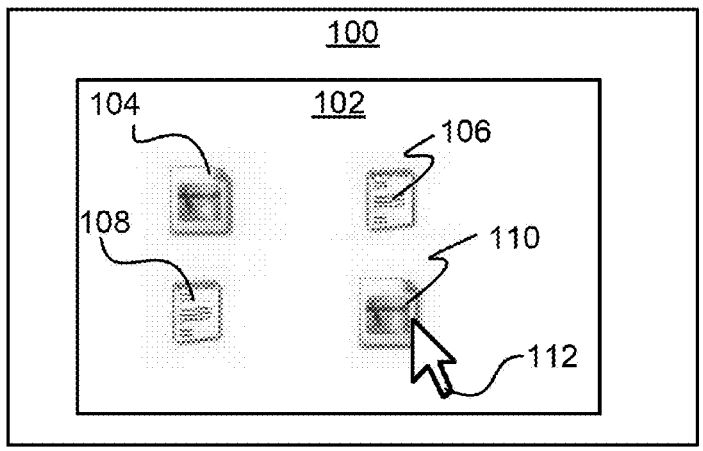
FIGS. 1A, 1B, and 1C illustrate an example an action-based user interface for interacting with a plurality of assets.
Figure 1B:
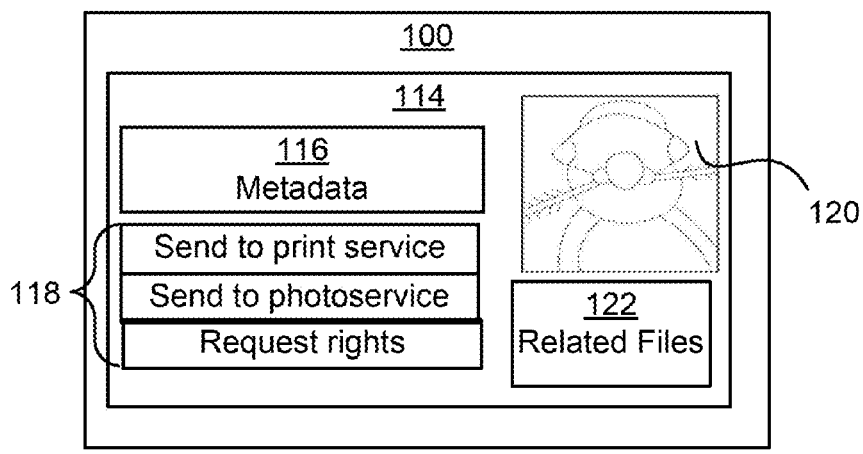
Figure 1C:
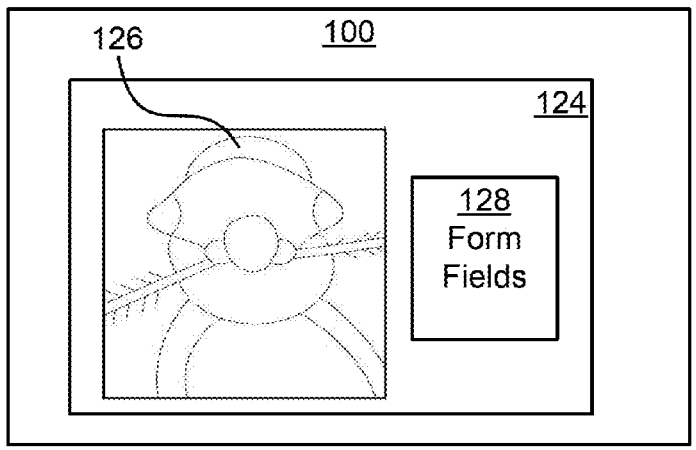

FIGS. 1A, 1B, and 1C illustrate an example an action-based user interface for interacting with a plurality of assets. As shown in FIG. 1A, a user interface 100 can include a window or other element 102 through which a user can interact with one or more of various files 104, 106, 108, and 110. For instance, user interface 100 may be responsive to user gestures such as clicking, hovering, dragging-and-dropping, or otherwise using a pointer 112 to identify a file (or files) of interest as shown in FIG. 1A. Other examples of user input can include, but are not limited to, keyboard commands, gestures and selections provided via a touch-sensitive display rendering interface 100 and/or voice commands.

In some embodiments, window 102 is provided by an operating system of a computing device, such as via a file browser used to browse one or more local or remote storage resources. In some embodiments, a third-party add-on can be used to interface with the operating system to allow a remote resource to appear as a local resource (e.g., a remotely-hosted storage device appears as a local hard drive). The asset-based interface may be included in the add-on that provides the functionality for browsing the remote resource.

Responsive to a command identifying file 110, a user interface 114 (referred to as an actionboard interface in examples below) is spawned as shown in FIG. 1B. For instance, in some embodiments, user interface 114 comprises an actionboard that indicates one or more available actions for the selected file or other asset. As an example, an actionboard program component may be included in or configured to operate with an operating system to intercept a file open command, such as when a user double-clicks on file 110 as shown in FIG. 1A. Instead of opening the file, the actionboard interface 114 can be presented. A file is used as an example here, but examples of assets include archives or "projects" comprising multiple files, or even file references such as a data structure comprising a file identifier and (optionally) metadata such as a thumbnail.

As shown in FIG. 1B, actionboard interface 114 comprises information about the identified file. For instance, metadata 116 can be displayed to provide information such as the file name, location, ownership rights, edit/access rights, version and/or any other information pertaining to the file. As shown at 118, a listing of available actions is also presented in interface 114. Particularly, each action corresponds to a service that can be invoked via interface 114, such as sending the file to a print service, sending the file to a photo editing service, or requesting rights to the file.

As an example, the print service may correspond to a local or remote printer. The photo editing service may comprise a web-based photo editing service such as Photoshop.com, available from Adobe Systems Incorporated of San Jose, Calif. Other examples of a service can include local applications—for instance, the photo editing service may correspond to use of a local application such as Adobe Photoshop®. The third service in the example of FIG. 1B comprises a rights request service. For instance, a creator of file 110 or other rights holder may distribute file 110 and make metadata available so that recipients can contact a rights management service (or the rights holder) to request rights via a web service or other mechanism.

Additionally, interface 114 includes a thumbnail view 120 of the content of file 110. For example, the thumbnail in this example comprises an image, although if the asset under consideration comprises another media file (e.g., an audio, video file, etc.), the thumbnail view can comprise corresponding audio or other content. Information regarding related files can also be included in interface 114. This information can include, but is not limited to, version data for related files, thumbnail views of related files, and editing/ownership information for related files.

As will be explained below, the contents of interface 114 can be generated based on data associated with the asset of interest, in this example, file 110. For example, an actionboard component can access a unique metadata record associated with file 110 and use information contained therein to populate interface 114. The metadata record may be specified for that particular file and thus can allow for a finer-grained control of client usage of the file. For example, rather than determining available actions by file type, the available actions are expressly noted in the metadata and used to determine what commands can be provided from the actionboard interface for files on an individualized basis.

FIG. 1C illustrates an example of a user interface after selection made in interface 114. For example, if "Request rights" is selected, this may cause the actionboard component to invoke a web service for obtaining rights associated with file 110. In FIG. 1C, this has resulted in generation of a window 124 with a full-size view 126 of the image stored in file 110 along with form fields 128 for providing payment and contact information. The contents of window 124 will, of course, depend on the particulars of the service that is invoked via interface 114. As another example, window 124 may represent and editing or viewing window of a local application used to render and/or edit file 110.

Figure 2:
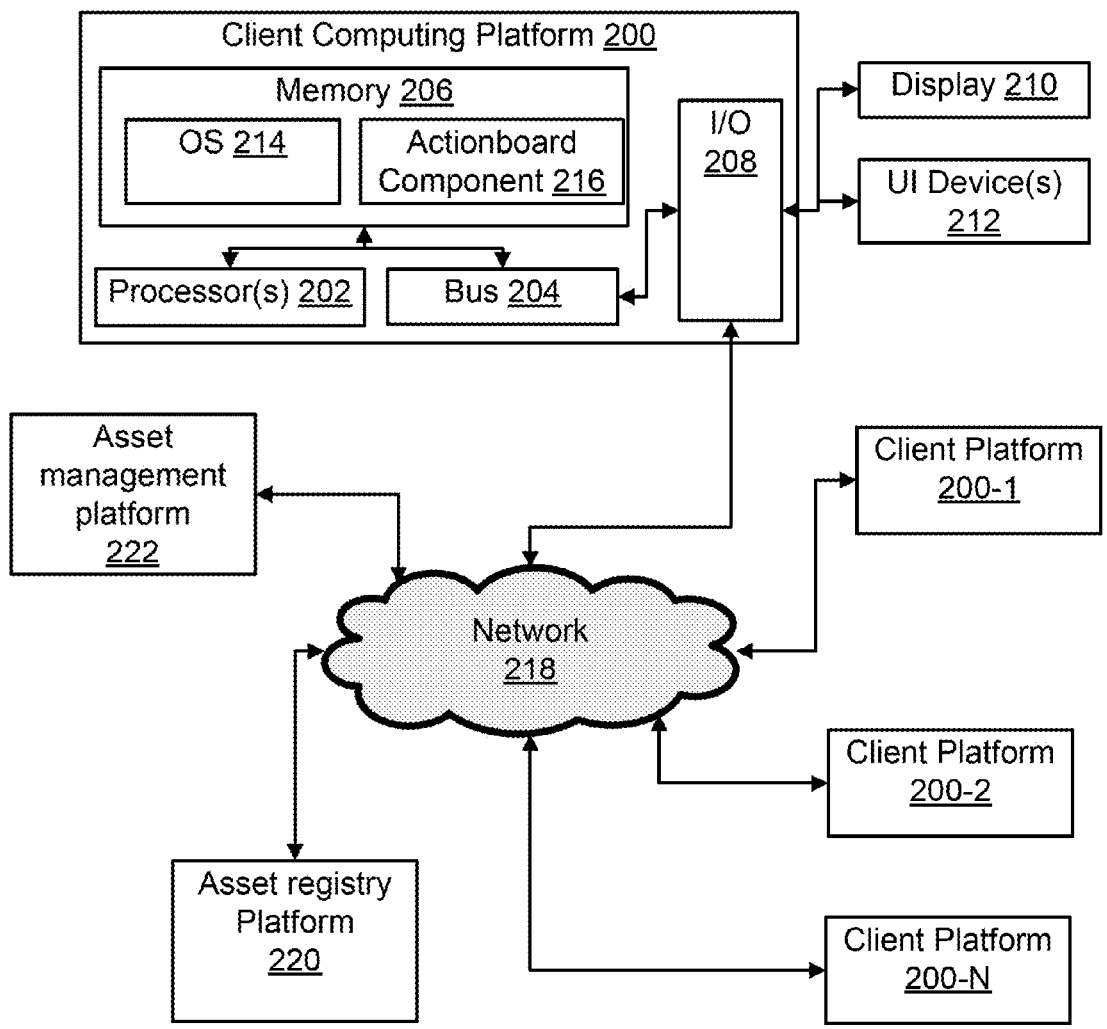
FIG. 2 is a block diagram showing an exemplary system including one or more computing platforms are configured to provide an action-based user interface.

FIG. 2 is a block diagram showing an exemplary system including one or more computing platforms 200 that are configured to provide an action-based user interface. In this example, each computing platform (200, 200-1, 200-2, and 200-N) is linked to additional network-based resources that can be used to identify available services and/or provide access to assets of interest.

A computing platform 200 can comprise a desktop, laptop, server, or other computer or another computing device (e.g., PDA, mobile phone, set-top box, portable media player, video gaming device, DVD/DVR, television, or other device). Computing platform 200 includes one or more processors 202 with access via bus 204 to a tangible computer-readable medium 206, which can comprise RAM, ROM, cache, or Flash memory or any other suitable storage medium. Additional components include input-output (I/O) interface components 208, which can comprise one or more busses, graphics processors, etc. for facilitating connection with various devices included in or interfaced to platform 200 such as display 210 and UI device or devices 212.

As an example, computing platform 200 can include one or more networking or other interfaces (e.g., Ethernet, Wi-Fi, USB, etc.) to allow access to network 218. User input (UI) devices can include, but are not limited to, a mouse, keyboard, touch screen interface, remote control, microphone, etc.

Other computer-readable media included in or accessible by computing platform 200 can include nonvolatile storage devices such as hard disk and/or optical drives.

Memory 206 embodies various program components, including an operating system 214 and an actionboard component 216. Other program components, such as applications, may also be resident in memory. Actionboard component 216 may comprise a stand-alone application, a plug-in for another application or operating system 214, or may be representative of functionality of an application or operating system 214.

Actionboard component 216 is representative of one or more program components that cause computing platform 200 to provide an action-based interfaces. For example, actionboard component 216 can cause the computing system to identify a command referencing an asset, access a unique metadata record associated with the asset and determine, based on the accessed metadata, an action available for use with the referenced asset. The component can cause the computing system to provide an interface comprising an interface element configured to receive a selection of the determined action. For instance, the actionboard component may produce an interface such as interface 114 shown in FIG. 1B with a list of available actions. Additionally, actionboard component 216 can also cause the computing system to invoke a service based on selection of an action in the interface.

In some embodiments, the metadata record is accessed from a computing device remote from computing platform 200. For example, in some embodiments, an asset registry computing platform 220 is accessed via network 218 (which may comprise one or more local area networks and/or a wide-area network, such as the Internet). Actionboard component 216 may provide a request to the asset registry, with the request identifying an asset by a unique identifier. The registry can return a metadata record identifying a plurality of services and indicating which services (if any) are available for use with the referenced asset.

Data returned from the registry may also indicate how to invoke one or more services. For example, some services may correspond to remote services not initially supported by or available to computing platform 200, such as a web service initially unknown to computing platform 200. The returned metadata can include data for accessing/using the web service, such as URLs, access parameters, and the like.

In some embodiments, the actionboard component additionally utilizes an asset management platform. For example, rather than accessing a locally-hosted file or other asset, a user of computing platform may identify a shortcut or reference to a file hosted by asset management platform 222. As a particular example, the file may be hosted in a content management system. In response to data referencing the asset, the actionboard component may also take steps to actually access the file. Accessing the file from the asset management platform may itself be an action whose availability is determined based on metadata in the registry. This may, for example, allow for controlled access to assets based on the metadata.

Actionboard component 216 need not be used with an asset management platform in all embodiments. For example, a photographer may distribute a low-resolution version of a photograph to several potential users. The photograph can include or can be associated with data including a unique identifier and the photographer can register the unique identifier with an asset registry such as the registry of platform 220. When other users attempt to access the distributed file using an actionboard component 216, the registry can be consulted for a list of available services. Based on information included in the registry by the photographer, the available services can include "obtain full rights to photograph." Interested users can select an action corresponding to the service in order to purchase a full-sized version of the photograph (or rights thereto) from the photographer or another source, such as by using a designated web service or rights clearing organization.

Continuing with the example, users who have purchased the full-sized version (or rights thereto) may be provided with metadata that allows an action corresponding to access to the full-sized version from the asset management platform 222 or another resource. As another example, users with rights to the full-sized version may have a "print" action available that would not otherwise be indicated had rights not been purchased. This and other functionality can be facilitated by tying client-side functionality accessible through the actionboard component to metadata maintained in the registry.

In this example, the metadata registry is relied upon by the actionboard component for obtaining metadata. However, some or all metadata can be maintained locally. For example, actionboard component 216 may maintain a local cache of metadata records for faster access. In some embodiments, an operating system maintains an index of metadata records and consults the index in response to input data selecting the file. As another example, files or other assets may include some embedded metadata usable by actionboard component 216.

Figure 3:
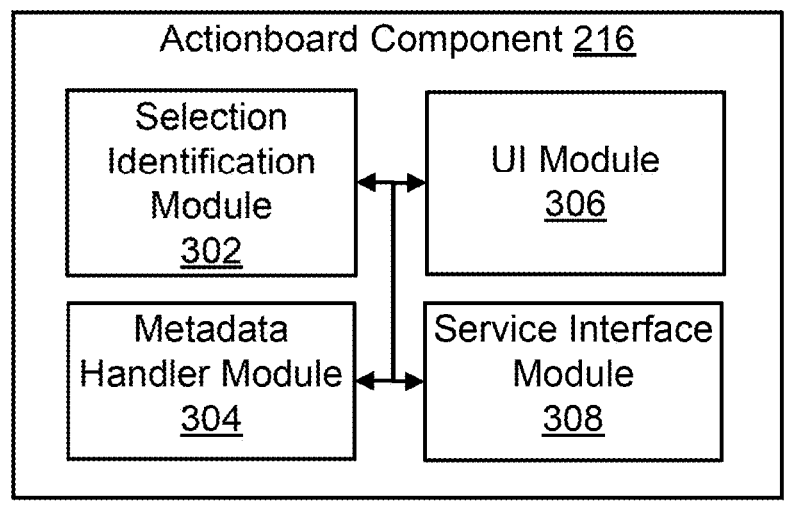
FIG. 3 is a block diagram showing an exemplary architecture for an actionboard component.

FIG. 3 is a block diagram showing an exemplary architecture for an actionboard component, such as actionboard component 216 of FIG. 2. This software architecture is intended to be illustrative of how an actionboard component can be configured, although other embodiments may utilize a different architecture. The actionboard component may comprise a standalone application, a plugin or service for an application or operating system, or may be integrated into the operating system.

One or more users may have administrator rights to a file and thus may be permitted to specify actions available for the file. For instance, a user may initially register the file in the metadata registry and specify the various actions via a web-based form or other interface generated by the registry. The file can be assigned a unique identifier by the registry, with the unique identifier included in the file (e.g., in header or title information) or in a metadata file associated with the file.

In this example, the actionboard component includes a selection identification module 302 that configures the computing system to identify a command referencing a file. For example, if actionboard component 216 is integrated into or configured to operate with an operating system, selection identification module 302 can comprise code that intercepts a file open command, move command, or other file manipulation command received while a file browsing interface is presented. °

For instance, the operating system may present a window or workspace featuring a list of files, icons for files, or other representations. When a user double-clicks (or otherwise indicates selection of a file), the normal operation (e.g., "file open") can be inhibited in favor of presenting the actionboard interface. This can be achieved by determining how the operating system exposes file selection events of interest (or modifying the operating system to expose file selection events of interest). When the double-click event is received or detected by selection identification module 302, the actionboard component can obtain a file identifier and other data used to access a unique metadata record for the file. Similar principles can apply when the file browsing interface is presented by an application or component running with in the operating system.

Metadata handler module 304 can configure the computing system to determine a plurality of actions for use with the referenced asset based on accessing a unique metadata record for the referenced file. For example, once a file is referenced, metadata handler module can access a unique identifier for the file and use the identifier in constructing a request to a registry of metadata records. The request may include other parameters, such as a user identifier, computing system identifier, or other information. Metadata handler module 304 can utilize a network connection if needed and/or may access a local copy of metadata records. To the extent that services information is included in or alongside the file, that information can be accessed by metadata handler module 304 as well. In some embodiments, handler module 304 may consult a local cache or index of metadata records instead of or in addition to checking one or more registries.

Metadata handler module 304 can parse the metadata to identify a listing of services available for use with the file. For example, a metadata record from the registry may list a plurality of services along with indicators of whether the service is available or not; alternatively, the metadata record may list only the available services. Similarly, metadata in or associated with the file may identify services. Metadata handler module 304 can recognize various types of metadata through use of a structured format such as XML for the metadata and/or by otherwise searching for recognizable syntax in the metadata. For example, the Extensible Metadata Platform (XMP) by Adobe Systems Incorporated of San Jose, Calif., may be used to specify metadata. Another example comprises the RDF data model.

The metadata records may also include other information recognized by metadata handler module 304. For instance, different fields in a record may identify creation date, author, version, available rights, and any other suitable information. As another example, the metadata may indicate whether the file is in use by another user and/or a history of the file. As a further example, the metadata record for a given file may include identifiers of other files that are related to the file. For instance, a metadata record for a photograph may include data identifying other resolutions of the photograph.

Metadata handler module 304 may fetch additional information to be included in the actionboard interface in addition to the listing of services. For example, a thumbnail of the file may be fetched from a remote resource or a thumbnail may be generated locally. If related files are identified in the metadata, metadata handler module 304 may construct a query to obtain a copy or thumbnail of the related files.

In some embodiments, an available action may correspond to a service that is previously unknown to the computing system. For example, instead of or in addition to a service corresponding to execution of an application, a web service or other remote resource may be available. The metadata for the file can include information detailing how to invoke the service, and metadata handler module 304 can identify this data and provide it to other components for use in invoking the service.

User interface module 306 configures the computing system to provide the actionboard interface, the interface comprising at least one user interface element to receive selection of one or more of the plurality of actions. For example, the user interface element can comprise a list of actions, with the actions selectable by clicking/hovering or other interaction with the list or interface elements such as buttons, checkboxes, and the like. User interface module 306 may rely on the list of available services and other metadata (e.g., file details, thumbnails) to populate portions of a layout template stored locally or even included in the metadata record for the file.

Metadata handler module 304 may check for updates to previously-accessed metadata. For example, while the actionboard interface is presented, metadata handler module 304 may periodically send a request for updated metadata to the registry in order to identify whether different services are available (or unavailable) or if other metadata is available. If updated metadata is indicated, metadata handler module 304 can pass an appropriate message to user interface module 306 to trigger regeneration or other updating of the interface based on the latest metadata.

Service interface module 308 configures the computing system to invoke at least one service in response to a selection received via the interface. For example, user interface module 306 may pass an event to service interface module when a particular action is selected in the interface. Services interface module 308 can interact with other components of the computing system, e.g., applications, the operating system, in order to invoke the service. For example, if the action is "open," then services interface module 308 can provide a command to the operating system to open the file; the selected action may specify a particular application and/or path for invoking the application and that information can be used as well. If the action is to open or check out a document from a content management system, services interface module 308 can pass a message to the content management system.

As another example, a selected action may correspond to a service defined by the metadata for the file. In response to selection of such a service, service interface module 308 can access the metadata and provide a request to the service as defined in the metadata. If an application (e.g., a web browser) is to be used, service interface module 308 can provide the request by invoking the application and passing parameters as needed (e.g., by specifying a URL for use in loading a web page corresponding to the service).

Service interface module 308/UI module 306 may respond to selections implicating additional action by the actionboard component. For example, the actionboard may provide indicators or thumbnails corresponding to related files. If one of the indicators/thumbnails is selected, UI module 306 and/or Services module 308 may provide an event or message to selection identification module 302 to request metadata corresponding to the related file and to present an actionboard corresponding to the related file.

The architecture noted in the example of FIG. 3 is for illustrative purposes and is not intended to be limiting. For example, in some embodiments, the user interface aspects are handled by a separate application, with the metadata access and retrieval handled by components included in the operating system.

Figure 4:
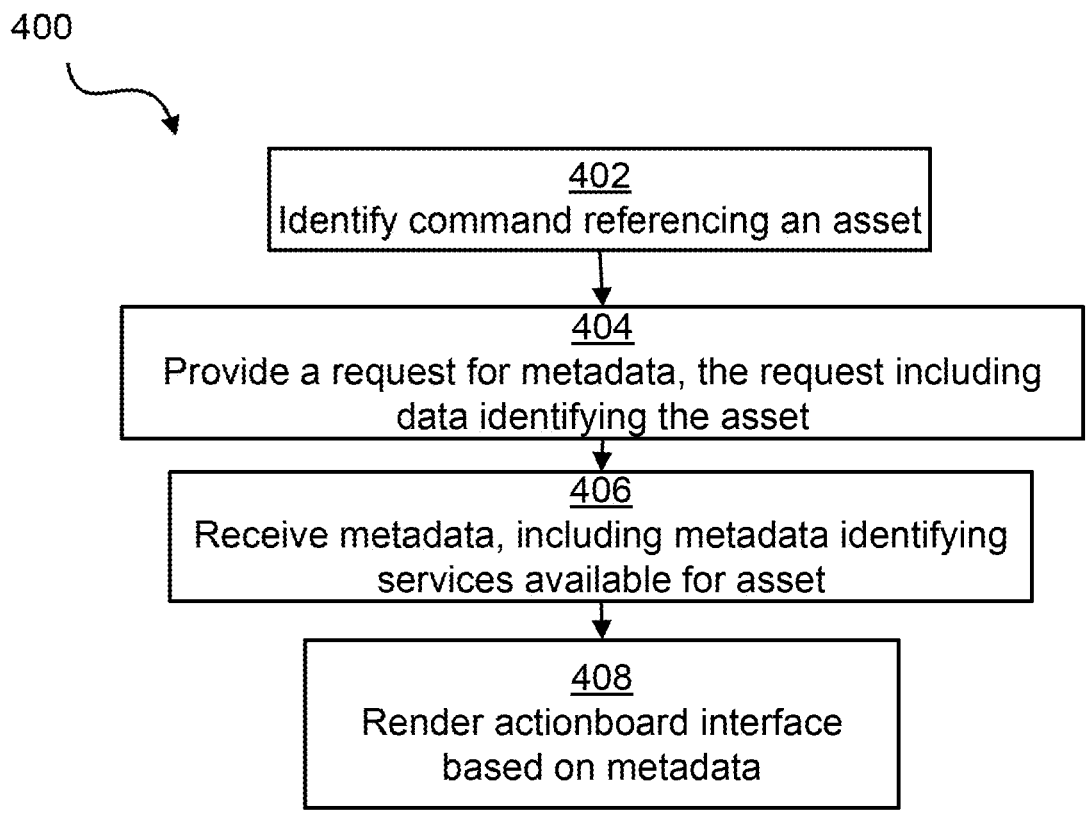
FIG. 4 is a flowchart showing an exemplary method for providing an action-based user interface for an asset.

FIG. 4 is a flowchart showing an exemplary method 400 for providing an action-based user interface for an asset. Block 402 represents identifying a command referencing an asset. As was noted above, the command may be an "open," "move," "copy," "delete," or other command, and may be provided in the context of a file browsing interface. The command may reference a locally-stored file or a file at a remote resource. The file browsing interface may be generated by an operating system that presents a window or other interface for viewing/browsing files, such as a desktop interface or a dialog used to browse directories and other collections of data. In some embodiments, an operating system command is intercepted by the actionboard component and the actionboard is presented instead of carrying out the command, although the desired command may ultimately be carried out by providing a corresponding command in the actionboard interface. In some embodiments, a file or representation thereof is displayed in an application (e.g., a web browser) and the command is identified by the application.

Block 404 represents providing a request for metadata to a registry or another resource, with the request including data identifying the asset. For example, as was noted above, a remote or local registry may include unique metadata records for each file, with the metadata records including a list of available services for use with the file. As another example, the request may be sent to a computing system hosting the file (e.g., a web server).

The services may be specified differently for different users, different computing systems, and/or other parameters, and so in some embodiments the request for the metadata record includes other parameters in addition to file identifiers. Additionally, some or all of the metadata may be embedded in or included in a file associated with the referenced asset.

Block 406 represents receiving metadata, including metadata identifying services available for the asset. For instance, a metadata record may be returned from the registry and/or metadata included in or associated with the file can be recognized. As another example, the computing system hosting the file may return the metadata record based on its own index or by accessing a registry and then relaying the data to the requesting client.

Block 408 represents rendering an actionboard interface based on the metadata. For instance, as was noted above, metadata identifying various services can be used to render interface elements for invoking those services that are available for use with the asset. If services are not available for use, then interface elements can be presented to indicate non-availability (e.g., ghosted-out buttons) or may not be included at all. Additionally, other metadata can be used to populate thumbnail and textual elements of the interface.

Figure 5:
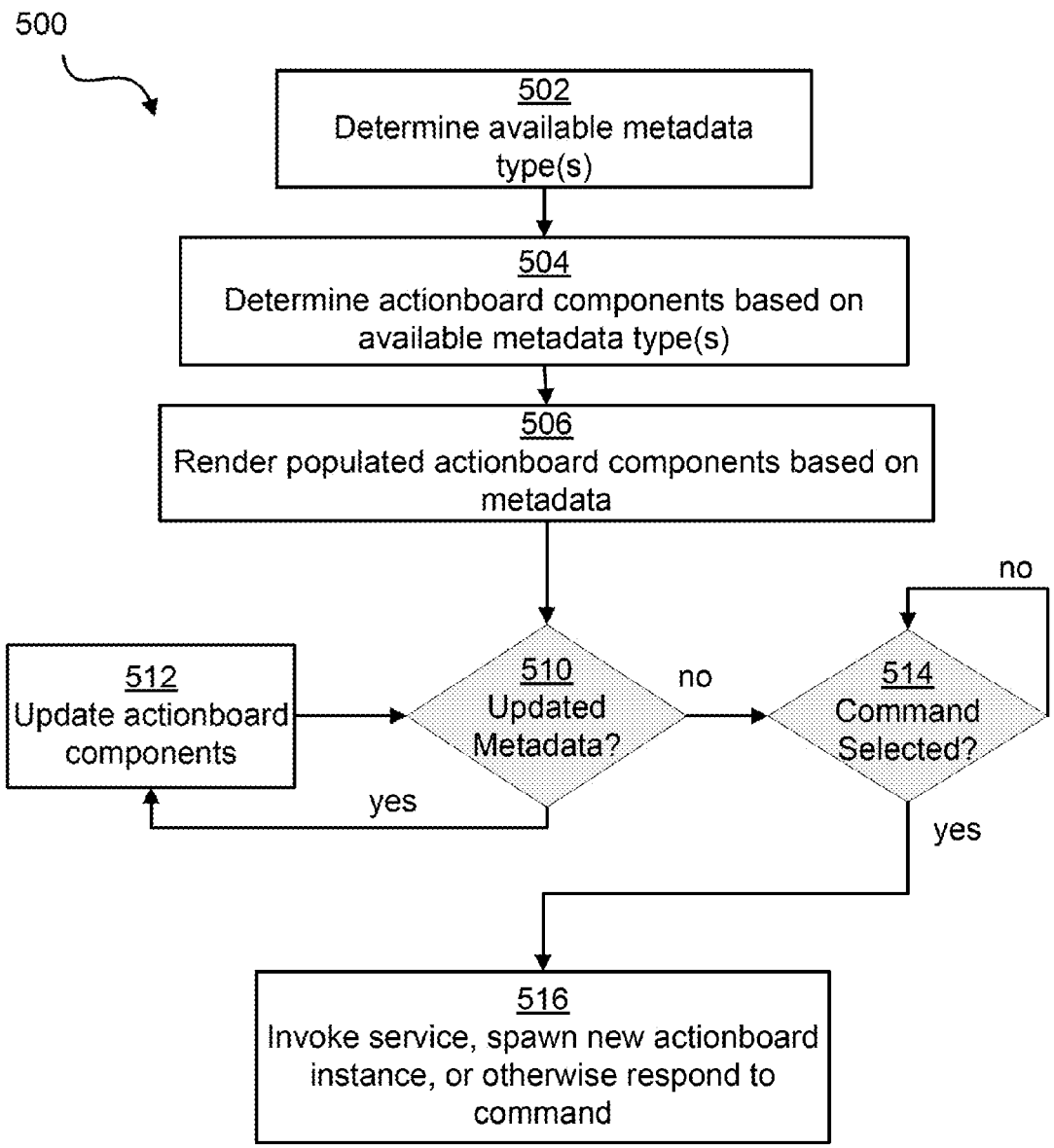
FIG. 5 is a flowchart showing an exemplary method for providing and using an action-based user interface for an asset.

FIG. 5 is a flowchart showing an exemplary method 500 for providing and using an action-based user interface for an asset. Particularly, exemplary details of creating the actionboard are provided.

Block 502 represents determining the available types of metadata. For instance, a metadata record may be divided into various fields corresponding to file name, location, author, version, history, digital rights information, pointers to thumbnails, related files, and a listing of available services for the file. These and/or other types of metadata can be recognized based on syntax and then used to determine at block 504 which components of the actionboard will be used. For example, the actionboard may include one or more layout templates (or such templates may be identified in the metadata) for arranging various combinations of components corresponding to interface elements for selecting actions, textual metadata, visual thumbnails, and other information.

Block 506 represents rendering populated actionboard components based on the metadata. For example, components such as buttons or links for selecting actions can be generated with identifiers for the actions, thumbnails can be fetched or generated based on local data, and the actionboard interface can be presented on-screen.

Block 510 represents checking for updated metadata. For instance, while the actionboard is presented on-screen, the metadata resource(s) (e.g., remote registry, local data) can be periodically checked to determine if metadata has changed. If so, then flow moves to block 512 and the new metadata is used to change the actionboard accordingly. For example, the metadata may initially identify a first version number and include an indicator that the file is in use by another user. This may cause the actionboard to be populated with text identifying the first version number and an overlay reading "in use."

Assuming the other user saves their edits as a new version, the next request for metadata may return a record identifying a second version number and an indicator that the file is no longer in use, and the actionboard can be updated accordingly. In some embodiments, the actionboard component provides a query on a periodic basis, although in some embodiments metadata updates can be "pushed" to the actionboard.

Returning to block 510, if no updated metadata is available, flow moves to block 514, which represents waiting for a command. Block 516 represents invoking a service, spawning a new actionboard instance, or otherwise responding to the command. For example, as was noted above, if an action is selected, an application, service, or other function can be invoked based on the selection. Alternatively, the user may simply close the actionboard or identify a different file from within the actionboard; in the latter case a new actionboard can be generated and presented alongside or instead of the present actionboard.

Although several examples noted above relate to actions taken with respect to the file, other actions can alter the metadata. For instance, a user can add comments, rights information, or change/alter metadata, either through editing fields in the actionboard or selecting one or more actions corresponding to metadata edits/changes.

Depending on the configuration of the actionboard component, multiple actionboards may be displayed simultaneously in order to view multiple files at once (e.g., related files) or a single actionboard can be provided for each file in turn. Additionally, although the examples discussed above presented an actionboard for a single file, the principle could be used when dealing with assets comprising multiple files or selection of multiple files. The multiple files could be presented in respective actionboards simultaneously or a single actionboard could be included with appropriate layout used to identify metadata and actions corresponding to the various files.

Figure 6:
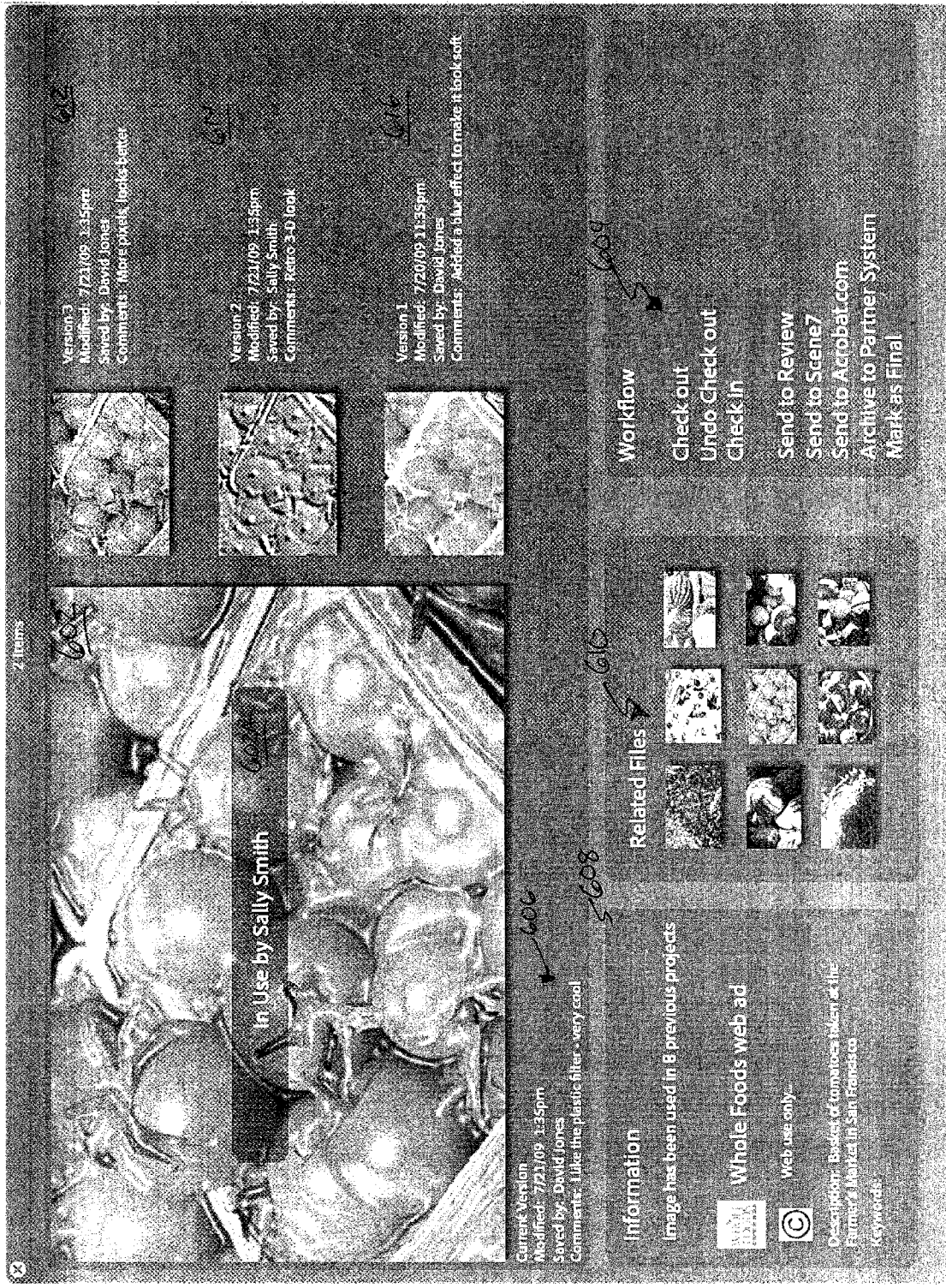
FIG. 6 is an example of an actionboard interface.

FIG. 6 is an example of an actionboard interface 600. In this example, the actionboard includes a preview image 602 a list of available actions 604 (check out, undo check out, check in, send to review, send to Scene7, send to Acrobat.com, archive to partner system, mark as final). The actions here correspond to actions for a content management system, use of local applications, use of a web service, and adding to metadata ("Mark as Final").

The actionboard further includes an overlay 602A over image 602 indicating that the file is in use. Textual metadata 606 identifies the current version, modification information, comments, and an identifier of the last user to save the image. Additional metadata 608 includes information on prior usage of the image, a description, a space for keywords, and rights management information ("Web use only"). Thumbnails 610 populate a "Related files" area and may allow a user to pull up a corresponding actionboard for those files.

In some embodiments, a first file may reference second, third, and fourth files, and the actionboard component can retrieve at least some of the metadata related to the second, third, and fourth files for use in populating an actionboard for the first file. Information regarding the second, third, and fourth files may be included in the metadata for the first file, or that metadata may be retrieved in response to identifiers in metadata for the current file. In this example, the first file corresponds to the file for image 602, while the second, third, and fourth files correspond to 612, 614, and 616. Here, the metadata for those files includes a thumbnail and selected editing history and comments.

Figure 7:
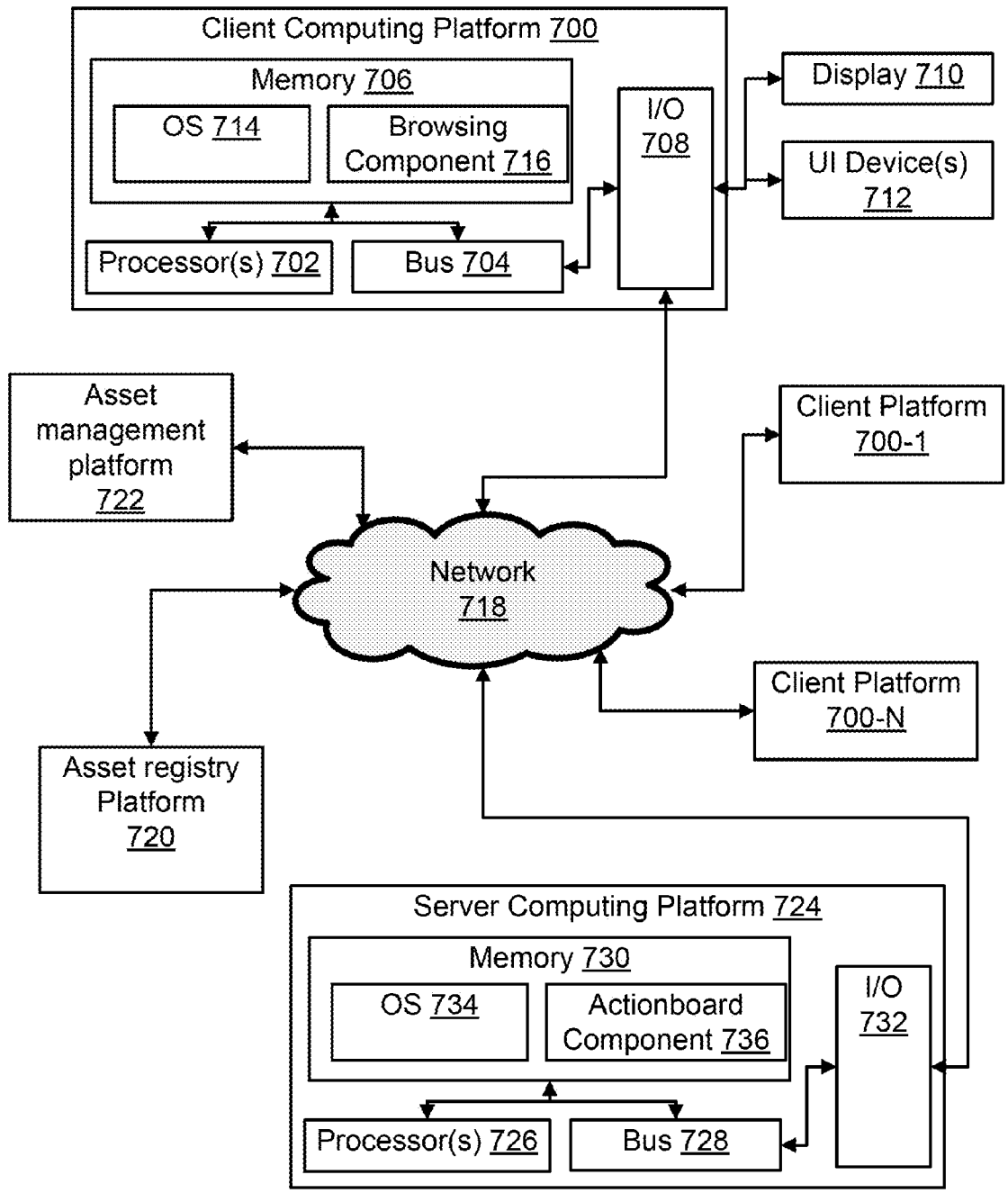
FIG. 7 is a block diagram showing another exemplary system including one or more computing platforms are configured to provide an action-based user interface.

FIG. 7 is a block diagram showing another exemplary system including one or more computing platforms are configured to provide an action-based user interface. This example features a client computing platform 700 including one or more processors 702, a bus 704, I/O components 708, display 710, and UI Device(s) 712 similar to client computing platform 200. Platform 700 is interfaced to network 718. In this example, memory 706 embodies an operating system 714 and a browsing component 716 that is configured to provide an actionboard interface based on data retrieved from another computing system, in this example server computing platform 724.

Server computing platform 724 also includes the exemplary processor, bus, i/o interface, and memory, and may represent a server computer or other device configured to act as a server by suitable program components. Memory 730 of server computing platform 724 features an operating system 734 and a server-side actionboard component 736.

Browsing component 716 and server-side actionboard component 736 can interact in order for an actionboard interface to be presented by client computing platform 700 (e.g., on display 710). For example, browsing component 716 may comprise a web browser or another application that retrieves a file hosted by server computing platform 724. For example, server computing platform 724 may host an image or other file included in a web page. The web page itself may be hosted by server computing platform 724 or may be hosted elsewhere (e.g., another server, not shown, hosts a web page that references the file hosted by platform 724).

The hosted file can comprise or reference metadata that allows browsing component 616 to access metadata for use in generating the actionboard interface. For example, in some embodiments, browsing component 716 can include UI components to receive user input, such as a right-click on an image file in a web page. In response to the selection, browsing component 716 then sends a request for metadata to server computing platform 724.

Server computing platform 724 may itself host some or all of the metadata for use by browsing component 716 in providing the actionboard. Additionally or alternatively, server computing platform 724 may request a list of available services from asset registry platform 720 and then forward some or all of that metadata to browsing component 716.

As an example use case, a photographer may post image files that include a watermark to a photo hosting service which uses a server computing platform such as 724. The photographer can associate a URL to an e-commerce site or another service with the file, which may be linked to the URL/service in an index maintained by server computing platform 724 and/or by registry platform 720. Other web users may view or even the file. However, the file retains the metadata link. A user of a computing system configured with browsing component 716 may right-click (or provide another suitable command) to display a list of services, with the list of services generated using metadata returned by server computing platform 724 based on its index and/or by reference to platform 720.

Browsing component 716 can be configured with suitable components (e.g., HTML parser, networking components, plug-in support) of a browsing application along with suitable interface components to support the actionboard. These can include components/modules to recognize actionboard-related commands, construct and provide a request for metadata from the host of the associated file and receive a list of services (and/or other metadata), generate an actionboard interface, and invoke a service (if any) selected from the interface. Server-side actionboard component 736 can include software components that recognize incoming requests and file references and, in response, return locally-stored metadata and/or retrieve the metadata from an appropriate source (e.g., asset registry platform 720).

As an example, actionboard component 736 may comprise a web service that recognizes an HTTP POST or other command generated by browsing component 716 comprising a browser plug-in. The POST or other command can include a parameter identifying the file (e.g. the file name, a unique ID extracted from the file or web page), and the server component can return the metadata in a recognizable format. As another example, AJAX or other techniques can be used to facilitate the client-server interaction for exchange of metadata to provide the actionboard interface.

Some embodiments of the present subject matter can provide workflow advantages. For example, in some embodiments, the actionboard interface allows for selection of file system (e.g., move, print, copy, cut, paste) actions, application actions, (e.g., open), and remote services (e.g., web services) actions in the same interface. Additionally or alternatively, by presenting the interface prior to taking any actions, user workflow can be improved by avoiding "wrong turns," such as would occur if the "default" application for a file type were to be invoked when a different application or service was needed. Instead, a user can proceed with a workflow centered around the asset, rather than getting to the asset by first choosing an application or service, and the user can discover services that might not otherwise be known to the user (and which can be added to or otherwise changed over time).

Still further, in some embodiments, a finer level of control is achieved because actions are determined based on metadata records unique to particular files or other assets, rather than other information such as file type alone. Accordingly, two files of the same type may, when referenced in the actionboard interface, have different sets of available actions.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, portable music players, and consumer electronic devices such as cameras, camcorders, and mobile devices. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method, comprising:
   intercepting, by a program component, a command provided through an interface of an operating system, the command referencing an asset, the command configured to cause the operating system to perform an action associated with the asset;
   in response to intercepting, by the program component, the command:
      preventing the operating system from performing the action associated with the asset; and
      instead of performing the action associated with the asset:
         accessing a unique metadata record corresponding to the asset;
         determining, based at least in part on the unique metadata record, a plurality of services; and
         providing an interface, the interface comprising a plurality of interface elements, each of a first subset of the plurality of interface elements corresponding to a respective service from the plurality of services, each of a second subset of the first subset of interface elements being configured to receive a selection of the respective service.

2. The method of claim 1, further comprising:
   receiving, via the interface, selection of an interface element from the second subset; and
   in response to receiving the selection, invoking the respective service corresponding to that interface element.

3. The method of claim 1, wherein accessing the unique metadata record corresponding to the asset comprises:
   determining a unique identifier associated with the asset; and
   requesting the unique metadata record from a registry at a remote computing system by at least providing the unique identifier to the registry.

4. The method of claim 1, further comprising:
   determining, based at least in part on the unique metadata record, a related asset, wherein at least one interface element in the first subset corresponds to the related asset.

5. The method of claim 1, further comprising:
while the interface is being provided:
digital a change in the unique metadata record; and
updating the interface based at least in part on the change.

6. The method of claim 1, wherein the operating system comprises the program component.

7. The method of claim 1, wherein the program component is configured to operate with the operating system.

8. The method of claim 1, wherein the command is provided through the interface of the operating system without presentation of a contextual menu.

9. The method of claim 1, wherein the command comprises at least one of a file open command, a move command, or a copy command, and wherein the action associated with the asset comprises at least one of opening the asset, moving the asset, or creating a copy of the asset.

10. The method of claim 1, wherein the unique metadata record comprises a template for the interface, and wherein providing the interface comprises arranging at least one of the plurality of interface elements based on the template.

11. The method of claim 1, wherein each of a third subset of the first subset of interface elements is configured to disable selection of the respective service.

12. The method of claim 1, wherein at least one service from the plurality of services comprises an open action, a print action, or a checkout action.

13. The method of claim 1, wherein the plurality of services comprises at least a print action, an editing action, and a rights action.

14. The method of claim 1, wherein at least one interface element from the plurality of interface elements corresponds to version information of a related asset or ownership information of the related asset.

15. The method of claim 1, wherein the asset comprises a first image comprising a first resolution, and wherein at least one interface element from the plurality of interface elements corresponds to a second image comprising a second resolution different from the first resolution, the first image and the second image being the same image.

16. The method of claim 1, further comprising:
determining that rights to the asset have been purchased; and
determining that an interface element from the plurality of interface elements belongs in the second subset based at least in part on the determination that rights to the asset have been purchased.

17. The method of claim 1, wherein the command is provided via a gesture on a touch-sensitive input device.

18. The method of claim 1, wherein the action comprises displaying a first user interface different from the provided interface.

19. The method of claim 1, wherein the command is configured to cause the operating system to reference a mapping of at least one of file types or MIME types to determine a first application for performing the action, and wherein the interface is provided by a second application different than the first application.

20. A computing system comprising a processor with access to a non-transitory computer-readable medium embodying program components, the program components comprising:
a selection identification module that configures the computing system to intercept a command provided through an interface of an operating system, the command referencing an asset, the command configured to cause the operating system to perform an action associated with the asset;
a metadata handler module that, in response to intercepting the command, configures the computing system to:
prevent the operating system from performing the action associated with the asset; and
instead of performing the action associated with the asset:
access a unique metadata record corresponding to the asset; and
determine, based at least in part on the unique metadata record, a plurality of services; and
a user interface module that, instead of performing the action associated with the asset, configures the computing system to provide an interface, the interface comprising a plurality of interface elements, each of a first subset of the plurality of interface elements corresponding to a respective service form the plurality of services, each of a second subset of the first subset of interface elements being configured to receive a selection of the respective service.

21. The computing system of claim 20, wherein the program components further comprise:
a service interface module that configures the computing system to:
receive, via the interface, selection of an interface element from the second subset; and
in response to receiving the selection, invoking the respective service corresponding to that interface element.

22. The computing system of claim 20, wherein access the unique metadata record corresponding to the asset comprises:
determining a unique identifier associated with the asset; and
request the unique metadata record from a registry by providing the unique identifier to the registry.

23. The computing system of claim 20, wherein the interface comprises a thumbnail image of the asset and a listing of the plurality of services, wherein selection of at least one of the plurality of services is disabled.

24. The computing system of claim 20, wherein the metadata handler module further configures the computing system to:
detect a change in the unique metadata record while the interface is being provided; and
update the interface based at least in part on the change.

25. A computer program product comprising a non-transitory computer readable medium embodying program code executable by a computing system, the program code comprising:
program code that causes the computing system to intercept a command provided through an interface of an operating system, the command referencing an asset, the command configured to cause the operating system to perform an action associated with the asset;
program code that causes the computing system, in response to intercepting the command, to:
prevent the operating system from performing the action associated with the asset; and
instead of performing the action associated with the asset:
access a unique metadata record corresponding to the asset;
determine, based at least in part on the unique metadata record, a plurality of services; and provide an interface, the interface comprising a plurality of interface elements, each of a first subset of the plurality of interface elements corresponding to a respective service from the plurality of services, each of a second subset of the first subset of interface elements being configured to receive a selection of the respective service; and program code that causes the computing system to, in response to receiving selection of an interface element from the second subset, invoke the respective service corresponding to that interface element.

26. The computer program product of claim 25, wherein determine, based at least in part on the unique metadata record, a plurality of services comprises:

determining a unique identifier associated with the asset; and requesting the unique metadata record from a registry at a remote computing system by at least providing the unique identifier to the registry.

27. The computer program product of claim 25, further comprising program code that causes the computing system to determine, based at least in part on the unique metadata request, a related asset, wherein at least one interface element in the second subset corresponds to the related asset.

28. The computer program product of claim 25, further comprising:

program code that causes the computing system to:
  detect a change in the unique metadata record while the interface is being provided; and
  update the interface based at least in part on the change.

* * * * *